(12) United States Patent
Smith

(10) Patent No.: US 10,089,297 B2
(45) Date of Patent: Oct. 2, 2018

(54) WORD ORDER SUGGESTION PROCESSING

(71) Applicant: Microsoft Technology Licensing, LLC, Redmond, WA (US)

(72) Inventor: Andrew Nicholas Paul Smith, London (GB)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/380,840

(22) Filed: Dec. 15, 2016

(65) Prior Publication Data
US 2018/0173690 A1 Jun. 21, 2018

(51) Int. Cl.
| | |
|---|---|
| G06F 17/00 | (2006.01) |
| G06F 17/27 | (2006.01) |
| G06F 3/0482 | (2013.01) |
| G06F 17/24 | (2006.01) |

(52) U.S. Cl.
CPC .......... G06F 17/273 (2013.01); G06F 3/0482 (2013.01); G06F 17/24 (2013.01)

(58) Field of Classification Search
CPC .................... G06F 17/273; G06F 17/30253
See application file for complete search history.

(56) References Cited

U.S. PATENT DOCUMENTS

| | | | |
|---|---|---|---|
| 5,572,423 A | 11/1996 | Church | |
| 5,761,689 A | 6/1998 | Rayson et al. | |
| 6,085,206 A * | 7/2000 | Domini | G06F 17/274 715/257 |
| 6,131,102 A | 10/2000 | Potter | |
| 7,207,004 B1 | 4/2007 | Harrity | |
| 7,584,093 B2 * | 9/2009 | Potter | G06F 17/2795 704/1 |
| 8,290,772 B1 * | 10/2012 | Cohen | G06F 17/276 369/25.01 |
| 8,626,681 B1 * | 1/2014 | Jurca | G06F 15/18 706/12 |

(Continued)

OTHER PUBLICATIONS

Krishna, et al., "An Information Retrieval Approach to Spelling Suggestion", Proceedings of the 19th international conference on World wide web, Apr. 26, 2010, pp. 1135-1136.

(Continued)

*Primary Examiner* — Laurie A Ries

(57) ABSTRACT

Non-limiting examples of the present disclosure describe processing that improves suggestions for a misspelt word. Examples described herein relate to processing executed by a client device or computing devices connected via a distributed network. In one example, an electronic document that comprises a misspelt word is accessed. An order of word suggestions for the misspelt word is determined based on an application of an exemplary word order suggestion model that analyzes the misspelt word based on: an analysis of an unformatted state of content within the electronic document and an analysis of formatting associated with content of the electronic document. Further aspects of an electronic document including file metadata may be analyzed by the word order suggestion model. A listing of suggestions for the misspelt word is provided, where an order of word suggestions included in the listing is determined based on the application of the word order suggestion model.

20 Claims, 9 Drawing Sheets

(56) References Cited

U.S. PATENT DOCUMENTS

| | | | |
|---|---|---|---|
| 9,122,376 B1* | 9/2015 | Brotherston | G06F 17/30637 |
| 9,384,244 B1* | 7/2016 | Garg | G06F 17/30864 |
| 2002/0010726 A1 | 1/2002 | Rogson | |
| 2006/0190447 A1 | 8/2006 | Harmon et al. | |
| 2007/0240043 A1 | 10/2007 | Fux et al. | |
| 2008/0155398 A1* | 6/2008 | Bodin | G06F 17/273 |
| | | | 715/257 |
| 2009/0249198 A1* | 10/2009 | Davis | G06F 17/276 |
| | | | 715/261 |
| 2012/0136650 A1 | 5/2012 | Udupa et al. | |
| 2012/0141031 A1 | 6/2012 | Boegelund | |
| 2013/0283156 A1* | 10/2013 | Al Badrashiny | G06F 17/273 |
| | | | 715/257 |
| 2014/0040238 A1* | 2/2014 | Scott | G06F 17/30637 |
| | | | 707/722 |
| 2014/0136190 A1 | 5/2014 | Lowles et al. | |
| 2014/0281943 A1* | 9/2014 | Prilepov | G06F 17/2735 |
| | | | 715/257 |
| 2016/0132545 A1 | 5/2016 | Bodin et al. | |

OTHER PUBLICATIONS

Alberto, et al., "SpellCheF : Spelling Checker and Corrector for Filipino", In Journal of Research in Science, Computing, and Engineering, vol. 4, Issue 3, Dec. 2007, pp. 61-64.

* cited by examiner

400

420

Suggestions From Processing Using Standard Model

430

Suggestions From Processing Using Word Order Suggestion Model

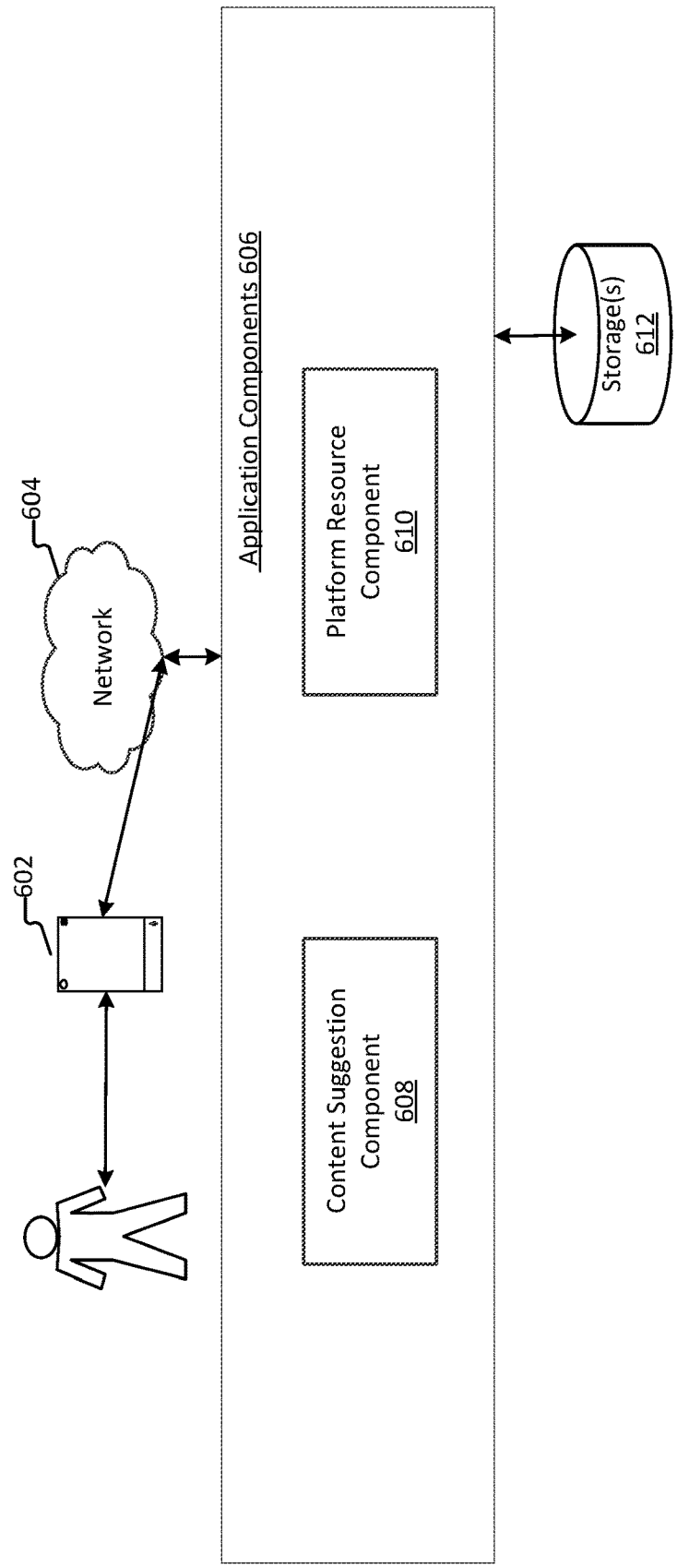

WORD ORDER SUGGESTION PROCESSING

BACKGROUND

Spell check is a commonly used in a variety of applications. An example application is a word processing application. Currently, spell check for word processing applications takes an unrecognized word (i.e. assume a misspelt word) and highlights that the word is unrecognized for a document author. The document author can right-click on the misspelt word and is provided with word suggestions based on one or more active dictionaries. Spell check commonly fails to account for a context of a document that a user is working in. Word suggestions appear to be suggested primarily based on their similarities to words in one or more reference dictionaries. However, this can result in irrelevant and erroneous word suggestions, which creates frustration for a user of the word processing application. As an example, a user may have to spend extra resources (time and processing operations) to identify a correct spelling for an intended word. Often, the user is required to look-up a correction for a misspelt word in another application. As such, examples of the present application are directed to the general technical environment related to improving processing efficiency and accuracy when providing suggestions for misspelt, among other examples.

SUMMARY

Non-limiting examples of the present disclosure describe processing that improves suggestions for a misspelt word. Examples described herein relate to processing operations executed by a client device or one or more devices connected via a distributed network. In one example, an electronic document that comprises a misspelt word is accessed. An order of word suggestions for the misspelt word is determined based on an application of an exemplary word order suggestion model that analyzes the misspelt word based on: an analysis of an unformatted state of content within the electronic document and an analysis of formatting associated with content of the electronic document. Further aspects of an electronic document including file metadata may be analyzed by the word order suggestion model. A listing of suggestions for the misspelt word is provided, where an order of word suggestions included in the listing is determined based on the application of the word order suggestion model.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 6 illustrates an exemplary system implementable on one or more computing devices on which aspects of the present disclosure may be practiced.

DETAILED DESCRIPTION

Figure 1:
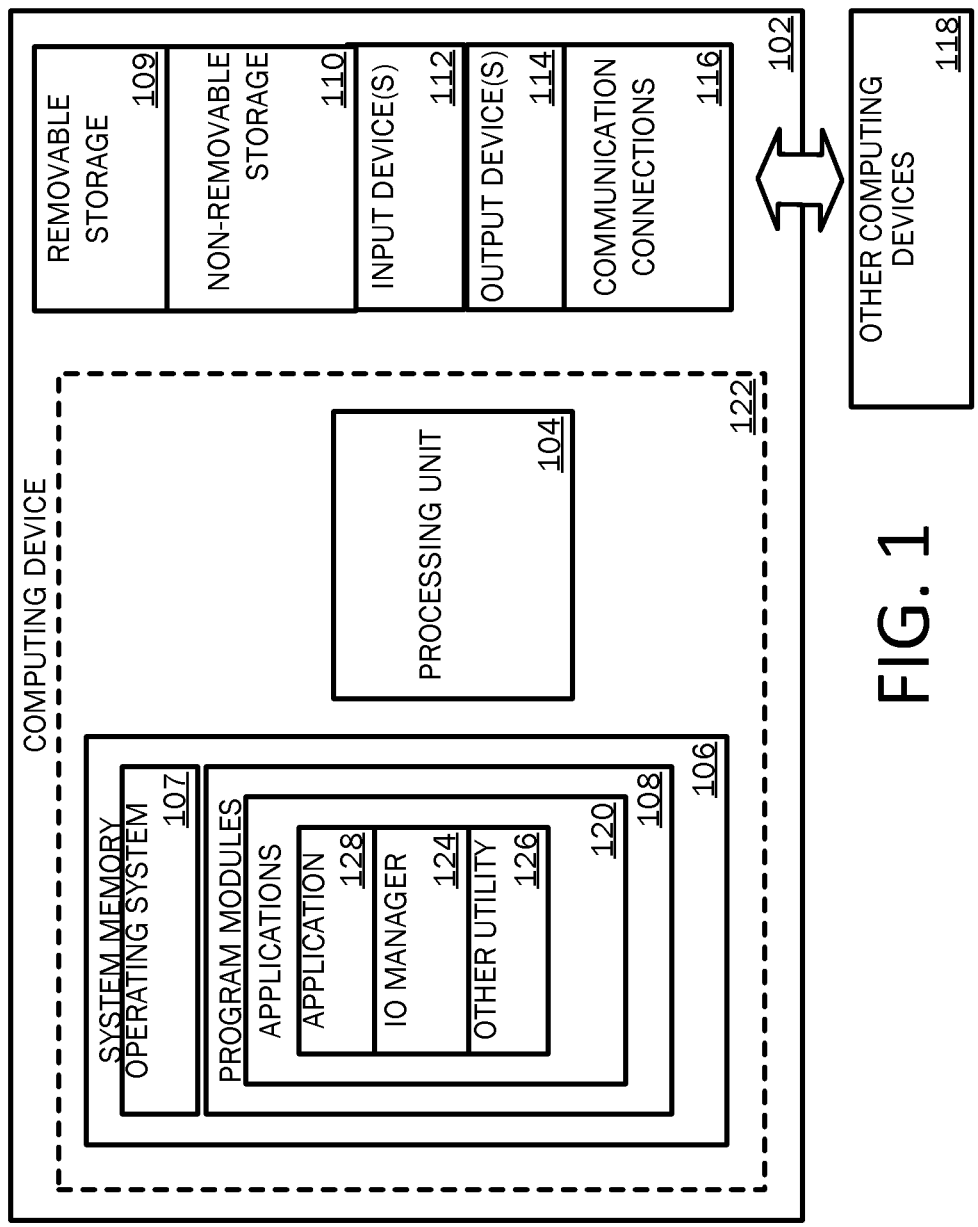
FIG. 1 is a block diagram illustrating an example of a computing device with which aspects of the present disclosure may be practiced.

Non-limiting examples of the present disclosure describe processing that improves suggestions for a misspelt word. Examples described herein relate to processing operations executed by a client device or one or more devices connected via a distributed network. In one example, an electronic document that comprises a misspelt word is accessed. An electronic document is a record of content presented in an electronic format. Examples of electronic documents comprise but are not limited to files, webpages and media objects, among other examples. An order of word suggestions for the misspelt word is determined based on application of an exemplary word order suggestion model that evaluates different aspects of an electronic document for the generation of a listing of suggestions for a misspelt word. The word order suggestion model may assign a weighting to evaluations of different aspects an exemplary electronic document including analysis of any of: an analysis of an unformatted state of content within the electronic document, an analysis of formatting associated with content of the electronic document and an analysis of file metadata associated with the electronic document, among other examples.

In one example, an application of the word order suggestion model determines word suggestions and an order for word suggestions based on analysis of: an unformatted state of content within the electronic document and formatting associated with the content of the electronic document. In evaluating an unformatted state of content of the electronic document, the one or more models may be configured to evaluate a similarity between the misspelt word and other words of the electronic document. For instance, frequency of words used in the electronic document may be evaluated. At least one word suggestion and/or a priority for ordering the word suggestion may be determined based on the evaluation of the frequency of words in the electronic document. With respect to analysis of the formatting of content of the electronic document, the word order suggestion model may be configured to evaluate an importance of specific words of the electronic document based on formatting associated with the specific words. Word suggestions and/or a priority for ordering word suggestions may be determined based on the analysis of the formatting associated with words of the electronic document.

In further examples, application of the word order suggestion model may further analyze file metadata associated with an electronic document to determine an ordering of suggestions for a misspelt word. An evaluation of file metadata associated with an electronic document may comprise evaluating one or more of: a title of the electronic document and file path information corresponding with the electronic document and/or one or more associated electronic documents. At least one word suggestion (and/or a priority for ordering the word suggestion) may be determined based on the evaluation of the file metadata associated with an exemplary electronic document.

A listing of suggestions is provided, where an order of the word suggestions included in the listing is determined based on the application of the word order suggestion model. It is to be understood that an exemplary listing of suggestions may comprise more than just word suggestions. An exemplary listing generated based on processing using an exemplary word order suggestion model is illustrated in FIG. 4C. However, user interface view 430 is just one example of an exemplary listing. One skilled in the art would recognize that data presented in an exemplary listing of suggestions may vary without departing from the spirit of the present disclosure.

As an example, a listing of suggestions may for the misspelt word be generated by a client computing device executing an exemplary productivity application. A productivity application is any application that is utilized to provide an exemplary electronic document. In alternative examples, a listing of suggestions for the misspelt word may be generated by one or more devices of a distributed network. In examples where an exemplary listing is generated by a distributed service, the listing may be transmitted to a client computing device, for example, for display with an executing productivity application. In some examples, the listing of suggestions may be newly generated based on application of the word order suggestion model describe herein. In other examples, the listing of word suggestions may be re-ordered based on application of the word order suggestion model. For instance, an application such as a word processing application may generate a listing of word suggestions. The generated listing of word suggestions may be re-ordered based on the application of the word order suggestion model described herein. In at least one example, re-ordering of a listing of word suggestions comprises adding at least one new word suggestion to a generated listing based on the application of the word order suggestion model.

While examples described herein relate to generation of an exemplary listing of words suggestions and/or re-ordering of a listing of word suggestions for a misspelt word, it is to be understood that modeling used for analysis of a misspelt word as described herein can be configured to generate other types of content for a user. For instance, contextual suggestions/recommendations can be provided to enhance a user experience based on analysis of content of an electronic document. As an example, an exemplary listing may comprise links to related content that a user can access for additional information. In other examples, associated files (stored either locally or on a distributed network) for a user may be identified. In some examples, associated files may be shared among a plurality of users.

Furthermore, an exemplary word order suggestion model (as described herein) can be applied to detect potentially misspelt words based on a context of an electronic document. As an example, a user may have entered a spelling of "brale" when the user intention was to enter the word "Braille". As "brale" may be considered a recognized word, a conventional spell check may not flag the use of "brale" as a potentially misspelt word. An exemplary word order suggestion model is configured to identify and flag potentially misspelt words based on a context of an electronic document. Word suggestions identifying a potentially unintended/misspelt word as well as rationale for why a word may be unintended/misspelt may be provided for a user, for example. For instance, a user may not have noticed that a wrong word or unintended word was entered. As an example, application of an exemplary word order suggestion model may flag a potentially unintended word and provide a user interface (UI) feature (e.g. bubble, call-out, etc.) provided a reason why a word suggestion is being provided.

Accordingly, the present disclosure provides a plurality of technical advantages including but not limited to: generation of an exemplary word order suggestion model, generation of improved listings that comprise more accurate suggestions for a misspelt word, more efficient operation of processing devices (e.g., saving computing cycles/computing resources) through improved accuracy in identifying most appropriate word suggestions in a first pass analysis, improving user interaction with productivity applications that are used to present an exemplary electronic document and extensibility to integrate processing operations described herein in a variety of different applications/services, among other examples.

Figure 2A:
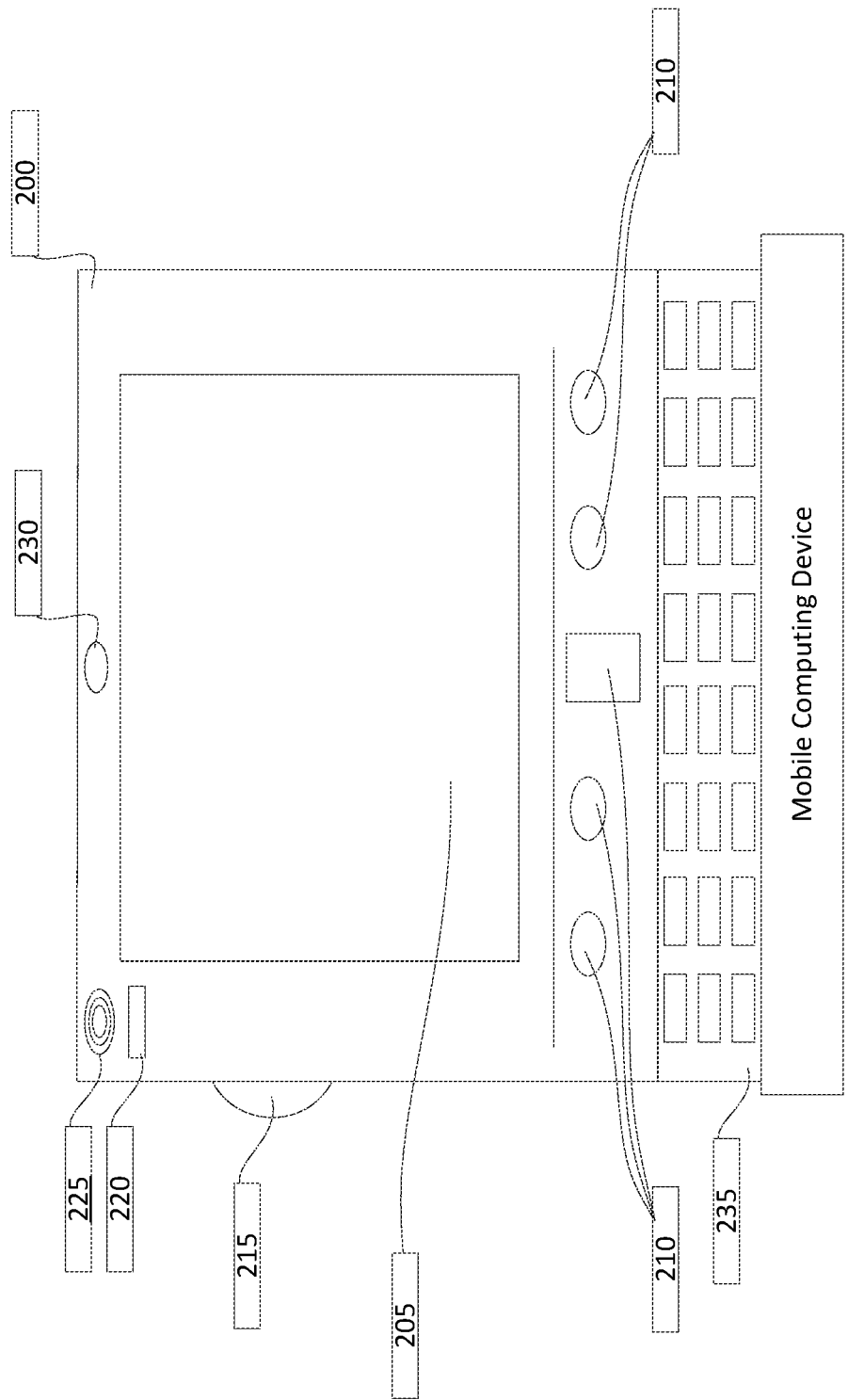
FIGS. 2A and 2B are simplified block diagrams of a mobile computing device with which aspects of the present disclosure may be practiced.
Figure 2B:
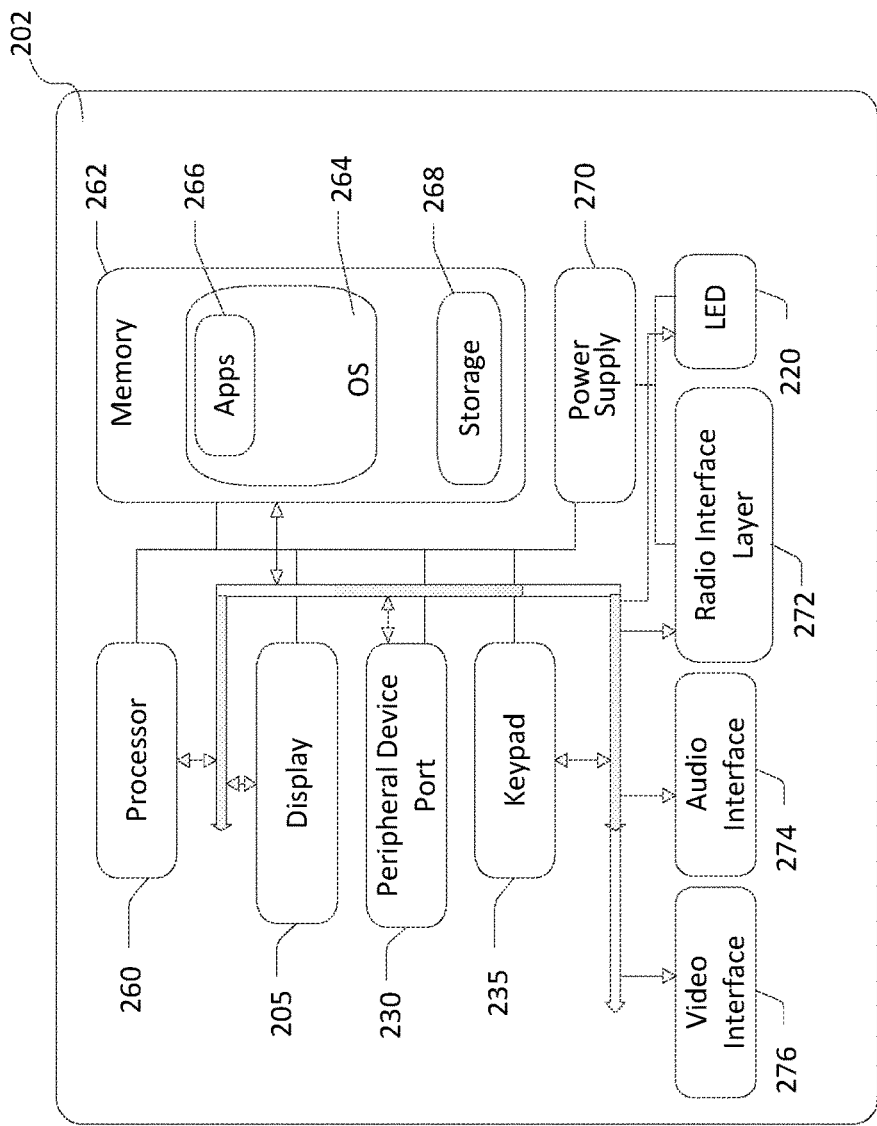
Figure 3:
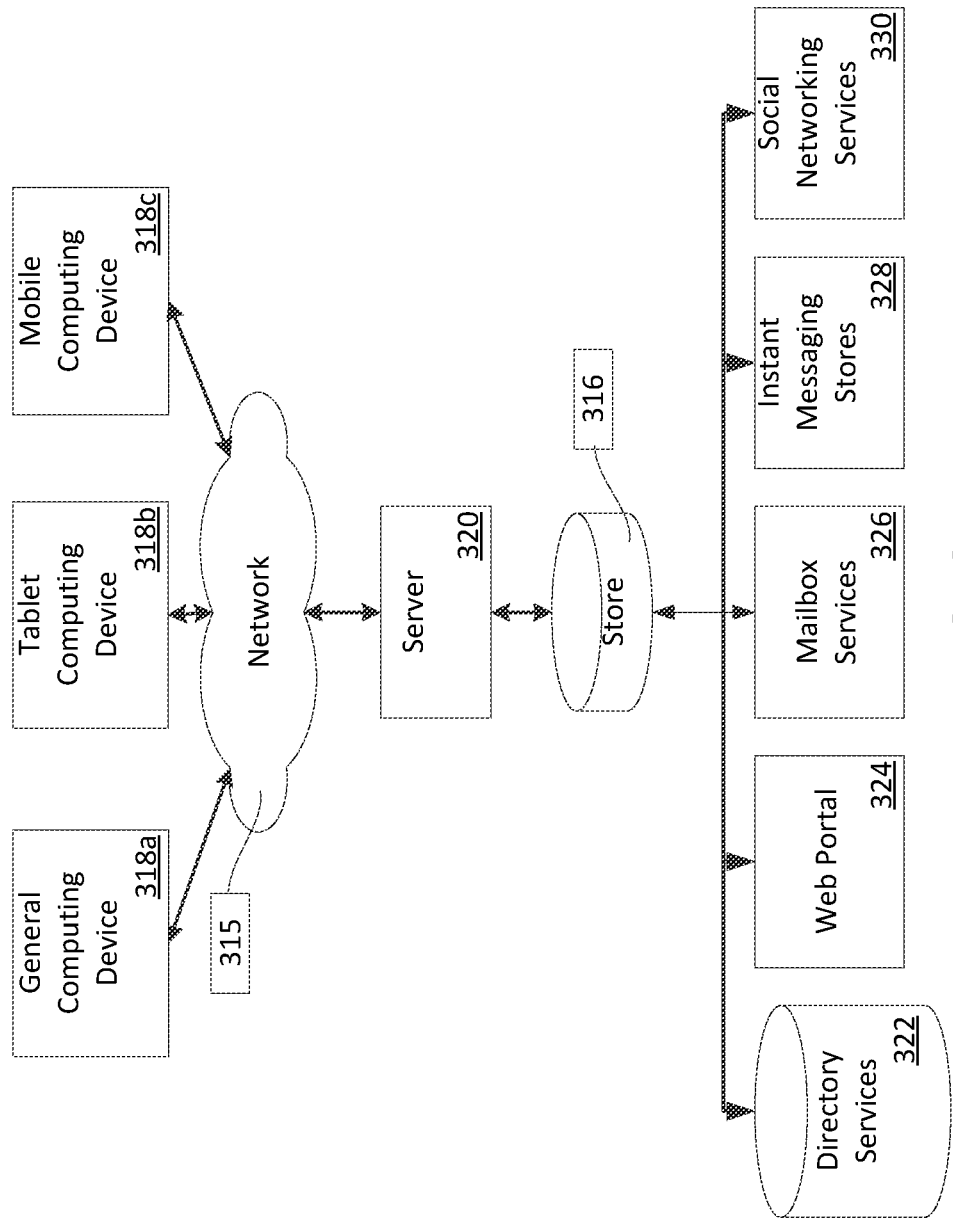
FIG. 3 is a simplified block diagram of a distributed computing system in which aspects of the present disclosure may be practiced.

FIGS. 1-3 and the associated descriptions provide a discussion of a variety of operating environments in which examples of the invention may be practiced. However, the devices and systems illustrated and discussed with respect to FIGS. 1-3 are for purposes of example and illustration and are not limiting of a vast number of computing device configurations that may be utilized for practicing examples of the invention, described herein.

FIG. 1 is a block diagram illustrating physical components of a computing device 102, for example a mobile processing device, with which examples of the present disclosure may be practiced. Among other examples, computing device 102 may be an exemplary computing device configured for execution of an exemplary word order suggestion model that is used to providing suggestions for a misspelt word as described herein. In a basic configuration, the computing device 102 may include at least one processing unit 104 and a system memory 106. Depending on the configuration and type of computing device, the system memory 106 may comprise, but is not limited to, volatile storage (e.g., random access memory), non-volatile storage (e.g., read-only memory), flash memory, or any combination of such memories. The system memory 106 may include an operating system 107 and one or more program modules 108 suitable for running software programs/modules 120 such as IO manager 124, other utility 126 and application 128. As examples, system memory 106 may store instructions for execution. Other examples of system memory 106 may store data associated with applications. The operating system 107, for example, may be suitable for controlling the operation of the computing device 102. Furthermore, examples of the invention may be practiced in conjunction with a graphics library, other operating systems, or any other application program and is not limited to any particular application or system. This basic configuration is illustrated in FIG. 1 by those components within a dashed line 122. The computing device 102 may have additional features or functionality. For example, the computing device 102 may also include additional data storage devices (removable and/or non-removable) such as, for example, magnetic disks, optical disks, or tape. Such additional storage is illustrated in FIG. 1 by a removable storage device 109 and a non-removable storage device 110.

As stated above, a number of program modules and data files may be stored in the system memory 106. While executing on the processing unit 104, program modules 108 (e.g., Input/Output (I/O) manager 124, other utility 126 and application 128) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 102 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 102 may also have one or more input device(s) 112 such as a keyboard, a mouse, a pen, a sound input device, a device for voice input/recognition, a touch input device, etc. The output device(s) 114 such as a display, speakers, a printer, etc. may also be included. The aforementioned devices are examples and others may be used. The computing device 104 may include one or more communication connections 116 allowing communications with other computing devices 118. Examples of suitable communication connections 116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 106, the removable storage device 109, and the non-removable storage device 110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 102. Any such computer storage media may be part of the computing device 102. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 2A and 2B illustrate a mobile computing device 200, for example, a mobile telephone, a smart phone, a personal data assistant, a tablet personal computer, a phablet, a slate, a laptop computer, and the like, with which examples of the invention may be practiced. Mobile computing device 200 may be an exemplary computing device configured for execution of an exemplary word order suggestion model that is used to providing suggestions for a misspelt word as described herein. Application command control may be provided for applications executing on a computing device such as mobile computing device 200. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 2A, one example of a mobile computing device 200 for implementing the examples is illustrated. In a basic configuration, the mobile computing device 200 is a handheld computer having both input elements and output elements. The mobile computing device 200 typically includes a display 205 and one or more input buttons 210 that allow the user to enter information into the mobile computing device 200. The display 205 of the mobile computing device 200 may also function as an input device (e.g., touch screen display). If included, an optional side input element 215 allows further user input. The side input element 215 may be a rotary switch, a button, or any other type of manual input element. In alternative examples, mobile computing device 200 may incorporate more or less input elements. For example, the display 205 may not be a touch screen in some examples. In yet another alternative example, the mobile computing device 200 is a portable phone system, such as a cellular phone. The mobile computing device 200 may also include an optional keypad 235. Optional keypad 235 may be a physical keypad or a "soft" keypad generated on the touch screen display or any other soft input panel (SIP). In various examples, the output elements include the display 205 for showing a GUI, a visual indicator 220 (e.g., a light emitting diode), and/or an audio transducer 225 (e.g., a speaker). In some examples, the mobile computing device 200 incorporates a vibration transducer for providing the user with tactile feedback. In yet another example, the mobile computing device 200 incorporates input and/or output ports, such as an audio input (e.g., a microphone jack), an audio output (e.g., a headphone jack), and a video output (e.g., a HDMI port) for sending signals to or receiving signals from an external device.

FIG. 2B is a block diagram illustrating the architecture of one example of a mobile computing device. That is, the mobile computing device 200 can incorporate a system (i.e., an architecture) 202 to implement some examples. In one examples, the system 202 is implemented as a "smart phone" capable of running one or more applications (e.g., browser, e-mail, calendaring, contact managers, messaging clients, games, and media clients/players). In some examples, the system 202 is integrated as a computing device, such as an integrated personal digital assistant (PDA), tablet and wireless phone.

One or more application programs 266 may be loaded into the memory 262 and run on or in association with the operating system 264. Examples of the application programs include phone dialer programs, e-mail programs, personal information management (PIM) programs, word processing programs, spreadsheet programs, Internet browser programs, messaging programs, and so forth. The system 202 also includes a non-volatile storage area 268 within the memory 262. The non-volatile storage area 268 may be used to store persistent information that should not be lost if the system 202 is powered down. The application programs 266 may use and store information in the non-volatile storage area 268, such as e-mail or other messages used by an e-mail application, and the like. A synchronization application (not shown) also resides on the system 202 and is programmed to interact with a corresponding synchronization application resident on a host computer to keep the information stored in the non-volatile storage area 268 synchronized with corresponding information stored at the host computer. As should be appreciated, other applications may be loaded into the memory 262 and run on the mobile computing device (e.g. system 202) described herein.

The system 202 has a power supply 270, which may be implemented as one or more batteries. The power supply 270 might further include an external power source, such as an AC adapter or a powered docking cradle that supplements or recharges the batteries.

The system 202 may include peripheral device port 230 that performs the function of facilitating connectivity between system 202 and one or more peripheral devices. Transmissions to and from the peripheral device port 230 are conducted under control of the operating system (OS) 264. In other words, communications received by the peripheral device port 230 may be disseminated to the application programs 266 via the operating system 264, and vice versa.

The system 202 may also include a radio interface layer 272 that performs the function of transmitting and receiving radio frequency communications. The radio interface layer 272 facilitates wireless connectivity between the system 202 and the "outside world," via a communications carrier or service provider. Transmissions to and from the radio interface layer 272 are conducted under control of the operating system 264. In other words, communications received by the radio interface layer 272 may be disseminated to the application programs 266 via the operating system 264, and vice versa.

The visual indicator 220 may be used to provide visual notifications, and/or an audio interface 274 may be used for producing audible notifications via the audio transducer 225 (as described in the description of mobile computing device 200). In the illustrated example, the visual indicator 220 is a light emitting diode (LED) and the audio transducer 225 is a speaker. These devices may be directly coupled to the power supply 270 so that when activated, they remain on for a duration dictated by the notification mechanism even though the processor 260 and other components might shut down for conserving battery power. The LED may be programmed to remain on indefinitely until the user takes action to indicate the powered-on status of the device. The audio interface 274 is used to provide audible signals to and receive audible signals from the user. For example, in addition to being coupled to the audio transducer 225 (shown in FIG. 2A), the audio interface 274 may also be coupled to a microphone to receive audible input, such as to facilitate a telephone conversation. In accordance with examples of the present invention, the microphone may also serve as an audio sensor to facilitate control of notifications, as will be described below. The system 202 may further include a video interface 276 that enables an operation of an on-board camera 230 to record still images, video stream, and the like.

A mobile computing device 200 implementing the system 202 may have additional features or functionality. For example, the mobile computing device 200 may also include additional data storage devices (removable and/or non-removable) such as, magnetic disks, optical disks, or tape. Such additional storage is illustrated in FIG. 2B by the non-volatile storage area 268.

Data/information generated or captured by the mobile computing device 200 and stored via the system 202 may be stored locally on the mobile computing device 200, as described above, or the data may be stored on any number of storage media that may be accessed by the device via the radio 272 or via a wired connection between the mobile computing device 200 and a separate computing device associated with the mobile computing device 200, for example, a server computer in a distributed computing network, such as the Internet. As should be appreciated such data/information may be accessed via the mobile computing device 200 via the radio 272 or via a distributed computing network. Similarly, such data/information may be readily transferred between computing devices for storage and use according to well-known data/information transfer and storage means, including electronic mail and collaborative data/information sharing systems.

FIG. 3 illustrates one example of the architecture of a system for providing an application that reliably accesses target data on a storage system and handles communication failures to one or more client devices, as described above. The system of FIG. 3 may be an exemplary system configured for execution of an exemplary word order suggestion model that is used to providing suggestions for a misspelt word as described herein. Target data accessed, interacted with, or edited in association with programming modules 108 and/or applications 120 and storage/memory (described in FIG. 1) may be stored in different communication channels or other storage types. For example, various documents may be stored using a directory service 322, a web portal 324, a mailbox service 326, an instant messaging store 328, or a social networking site 330, application 128, IO manager 124, other utility 126, and storage systems may use any of these types of systems or the like for enabling data utilization, as described herein. A server 320 may provide storage system for use by a client operating on general computing device 102 and mobile device(s) 200 through network 315. By way of example, network 315 may comprise the Internet or any other type of local or wide area network, and a client node may be implemented for connecting to network 315. Examples of a client node comprise but are not limited to: a computing device 102 embodied in a personal computer, a tablet computing device, and/or by a mobile computing device 200 (e.g., mobile processing device). As an example, a client node may connect to the network 315 using a wireless network connection (e.g. WiFi connection, Bluetooth, etc.). However, examples described herein may also extend to connecting to network 315 via a hardwire connection. Any of these examples of the client computing device 102 or 200 may obtain content from the store 316.

Figure 4A:
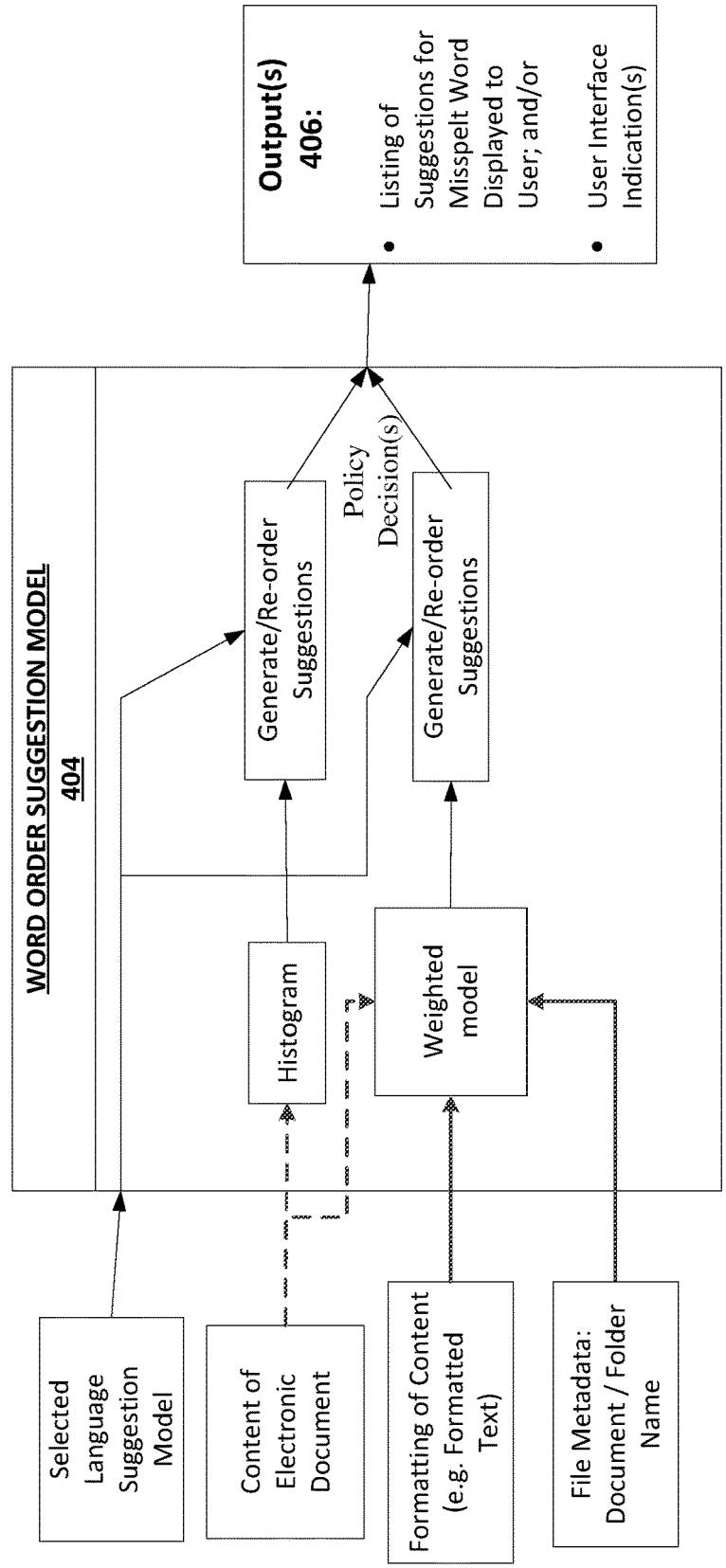
FIG. 4A is an exemplary process flow for management of an exemplary word order suggestion model with which aspects of the present disclosure may be practiced.

FIG. 4A is an exemplary process flow 400 for management of an exemplary word order suggestion model 404 with which aspects of the present disclosure may be practiced. An exemplary word order suggestion model 404 may be configured to identify suggestions for a misspelt word, for example, in an exemplary electronic document. As described above, an electronic document is a record of content presented in an electronic format. As examples, an electronic document may comprise but is not limited to: files, webpages and media objects, among other examples. The word order suggestion model 404 is configured to consider context of an electronic document in providing suggestions for a misspelt word by evaluating different aspects of an electronic document. Suggestions may comprise word suggestions as well as other types of suggestions such as contextual suggestions, links, people, etc.

An order of word suggestions for the misspelt word is determined based on application of an exemplary word order suggestion model 404 that evaluates different aspects of an electronic document for the generation of a listing of suggestions for a misspelt word. The word order suggestion model may assign a weighting to evaluations of different aspects an exemplary electronic document including analysis of any of: an unformatted state of content within the electronic document, formatting associated with content of the electronic document and file metadata associated with the electronic document, among other examples.

The word order suggestion model 404 may receive a plurality of inputs 402. Exemplary inputs 402 comprise: a selected language model, an unformatted state of content within an electronic document, formatting associated with content of an electronic document and file metadata associated with an electronic document. In some examples, an exemplary word order suggestion model 404 may execute processing operations to acquire inputs 402 related to an exemplary electronic document. In one example, the word order suggestion model may parse and evaluate different aspects of an electronic document such as content of the electronic document, formatting associated with the content of an electronic document and file metadata associated with an electronic document, among other examples. In alternate examples, an exemplary word order suggestion model 404 may interface with other resources that provide exemplary inputs 402. For instance, computing devices that are configured to generate and manage an exemplary word order suggestion model 404 may interface with platform resources that may comprise a variety of application/services (e.g. first-party, second-party or third-party resources) that may extensibility enhance processing capabilities of one or more components associated with an exemplary word order suggestion model 404.

An exemplary word order suggestion model 404 may selectively apply one or more models to adapt word suggestions provided by a selected language model. For instance, the word order suggestion model 404 is configured to apply a model to evaluate different aspects of an electronic document. In one example, the same model may be used to evaluate content of an electronic document, formatting associated with content of the electronic document as well as file metadata associated with the electronic document. In such an instance, the model may be tailored to apply weights to different aspects of the electronic document to make determinations such as: most applicable word suggestions for a misspelt word and how to prioritize/order word suggestions for a misspelt word. In another example, a first model may be applied to evaluate content of the electronic document and another model may be applied to evaluate other aspects of the electronic document (e.g. formatting associated with content of the electronic document and file metadata associated with the electronic document). For instance, an unweighted model may be used to evaluate unformatted content (i.e. irrespective of formatting) and a weighted model may be utilized to evaluate other aspects of the electronic document. In yet another example, different models may be applied to evaluate different aspects of the electronic document such as content of the electronic document, formatting associated with content and file metadata. As such, it is to be understood that an exemplary word order suggestion model 404 may be configured to be optimized for processing efficiency and/or accuracy in providing relevant suggestions, for example, depending on processing device capabilities, network bandwidth, etc.

A selection language model (of inputs 402) is configured to provide one or more language models that can be applied to evaluate content of an exemplary electronic document. Language model types for selection and application of selected language models are known to one skilled in the art. Input provided by a selected language model may comprise but is not limited to: speech/text recognition, dictionary analysis, machine translation, part-of-speech tagging, parsing/recognition, handwritten recognition, information retrieval and generation of suggestions for misspelt words, among other examples. In one example, a selection language model may generate suggestions for misspelt word based on analysis executed by a selected language model. Suggestions for a misspelt word may comprise word suggestions identified by language model processing. In examples, an exemplary word order suggestion model 404 may receive such suggestions and rewrite/re-order suggestions (including word suggestions) based on application of processing different aspects of an exemplary electronic document.

Content of an electronic document (of inputs 402) is an aspect of an electronic document that is evaluated by an exemplary word order suggestion model 404, for example, to identify suggestions for a misspelt word. Content may comprise any type of data including text, media objects, images, handwritten input, audio files, etc. that is included within an exemplary electronic document. While examples described herein may reference text/words, it is to be understood that other forms of content can be similarly evaluated for identification to determine an association with a misspelt word as well as prioritize suggestions (e.g. word suggestions, content suggestions, etc.). For instance, image processing and/or optical character recognition (OCR) may be applied to evaluate image content.

As an example, text (e.g. particular words) and context of the text may be evaluated in a manner that is irrespective of the formatting associated with words, paragraphs, blocks of text, etc. Processing operations may be applied to parse and identify an unformatted state of content. That is, an exemplary word order suggestion model 404 may execute an analysis of an unformatted state of content within the electronic document. As described subsequently, in some examples an analysis of formatting associated with specific portions of content may be a separate evaluation for identification of importance of specific text. However, in other examples the word order suggestion model 404 may aggregate an evaluation of an unformatted state of content and the formatting associated with the content.

In one example the word order suggestion model 404 may be configured to generate a histogram of words in an electronic document. A histogram is a display of statistical information, for example, in a graphical form. A histogram may be utilized for analysis of an unformatted state of content, providing processing efficiency advantages as compared to running more complex analyses such as machine-learning modeling or processing using deep neural networks, among other examples. However, a histogram is just one example of how content of a document may be analyzed. Other examples may apply machine-learning modeling, deep neural network modeling or any other type of data analysis processing operations. The word order suggestion model 404 may apply a histogram model that is configured to analyze an unformatted state of content of an electronic document, where suggestions (including word suggestions) may be generated and/or ordered based on histogram modeling analysis. In one example, an exemplary listing of suggestions for a misspelt word may be generated as an output (output(s) 406) from histogram model processing. In other examples, an output 406 may be generated based on processing operations that factor results of histogram modeling in combination with weighted model processing of other aspects of evaluation for the electronic document. As can be seen in process flow 400, input 402 pertaining to content of an electronic document may be input either to a histogram model or a weighted model.

Suggestions for a misspelt word as well as ordering of word suggestions may be determined based on the frequency of words already existing in an electronic document. Evaluating the content (and context of specific content) of an electronic document may help identify more application suggestions such as word suggestions for a misspelt word as well as provide a basis for prioritizing an order for word suggestions. The word order suggestion model may be configured to evaluate frequency of words within an electronic document as well as evaluate a similarity between the misspelt word and other words of the electronic document. For instance, frequency of words used in the electronic document may be evaluated using a histogram, weighted model, etc. Results from modeling can be analyzed to identify word suggestions from the electronic document that possess similarity to a misspelt word. For instance, processing operations may be applied to evaluate similarity in any of characters, letters, numbers, symbols, arrangement, positions, etc. As an example, the word order suggestion model 404 may be configured to evaluate phonetic similarity as a basis for similarity evaluation between the misspelt word and other words of the electronic document. In one instance, phonetically similar words for a misspelt word may be identified based on language understanding processing that may utilize a dictionary or other knowledge resource to identify phonetically similar suggestions for a misspelt word. In further examples, an analysis of phonetic similarity of words may extend to an evaluation of phonetic similarity between a misspelt words and other words of the electronic document, for example, where histogram modeling and/or weighted modeling is used for evaluation of phonetic similarity between the misspelt word and other words of the electronic document. In one example, modeling applied may generate similarity scores between a misspelt word and other words within an electronic document. One or more highest scoring words may be output as word suggestions within an exemplary listing of suggestions for a misspelt word. In some examples, an indication of priority for ordering of word suggestions may be generated based on modeling that evaluates content of the electronic document.

With respect to an evaluation of frequency of words within an electronic document, a word might be spelled correctly multiple times throughout a document but misspelt at a later point in a document. Consider a case where a document is being written about Braille (a tactile writing system for the visually impaired). The word "Braille" is commonly misspelled. In some cases, a misspelling of the word may be so poor that it becomes difficult for a language model to recognize an intention to spell "Braille". In such an instance, a language model may provide inaccurate suggestions for the word. With respect to the "Braille" example, the fact that the word had been written a great number of times in the preceding text would indicate that "Braille" should be an offered word suggestion and possibly prioritized at the top of a listing of word suggestions provided to a user. Processing provided by an exemplary word order suggestion model 404 can remedy such issues.

Words identified through modeling (e.g. histogram, weighted model, etc.) may be further analyzed for contextual analysis. Other contextual aspects related to content of an electronic document such as placement and/or position of a word (in a sentence, paragraph, electronic document, etc.), type of word, meaning of the word other associated words, additionally retrieved data providing context, etc. may also be analyzed and factored into a decision as to whether to provide a word as a suggestion and/or how to prioritize a suggestion. In some cases, the word order suggestion model 404 may be configured to interface with other platform resources for processing and/or information retrieval. Platform may comprise a variety of application/services (e.g. first-party, second-party or third-party resources) that may extensibility enhance processing capabilities of one or more components associated with an exemplary word order suggestion model 404.

Consider an example where a user entered a spelling of "brale" when the user intention was to enter the word "Braille". As "brale" is a recognized word, a conventional spell check may not flag the use of "brale" as a potentially misspelt word. An exemplary word order suggestion model 404 is configured to evaluate context of content within an electronic document, which may be useful in identifying not only misspelt words but unintended words for a context of a document. Word suggestions identifying a potentially unintended/misspelt word as well as rationale for why a word may be unintended/misspelt may be provided for a user, for example, in an exemplary listing of suggestions for a misspelt word (output 406). For instance, a user may not have noticed that a wrong word or unintended word was entered. As an example, application of an exemplary word order suggestion model may flag a potentially unintended word and provide a user interface (UI feature (e.g. bubble, call-out, etc.) provided a reason why a word suggestion is being provided. Such suggestions may be provided as an output 406, for example within an exemplary listing of suggestions for a misspelt word and/or as a UI indication that a word may be misspelt or unintended.

Formatting of content (of inputs 402) is another aspect that may be evaluated by an exemplary word order suggestion model 404. An analysis of formatting associated with content of an electronic document can be used to evaluate importance of specific portions of content (e.g. text/words) within an electronic document. As shown in process flow 400, input 402 pertaining to formatting of content feeds into a weighted model that is used to apply weighting to different attributes of formatting. For instance, processing operations may be executed that parse metadata (e.g. file data/attributes, source code, scripting language) associated with an electronic document and/or specific content within an electronic document. The formatting attributes of content may then be evaluated by the word order suggestion model 404. Word suggestions and/or a priority for ordering word suggestions may be determined based on the analysis of the formatting associated with words of the electronic document.

Some words are more important than others in predicting the words that should be provided as spelling corrections in a document. The word order suggestion model 404 may utilize a weighted model to identify importance of words based on formatting. An exemplary weighted model may identify a type/level of formatting associated with content and assign an appropriate weighting to that type/level. As an example, general content such as text that is identified by the font size, lack of bold text, lack of italics, or contained in a block of text may be assigned a certain weighting. In one example, general content/text may be assigned a lowest weighting in the model. Highlighted content/text that is identified by color/bold/italics may be assigned a greater weighting in the model. Furthermore, headlining content/text identified as a heading (determined by size, underline, etc.) may be assigned an even greater weighting in the model. Other formatting types may also be considered including but not limited to: user indications with respect to content, number of comments from one or more users and tracking of changes, among other examples. It is to be understood that developers can include any evaluate any type of formatting attributes as well as set/manipulate weighting for formatting attributes. As an example, the greater the weighting of a word in the model, the more likely that a word will be suggested on a listing of suggestions or the word will occur higher up on the list than it normally would merely by using the similarity of the misspelt word when compared to generic dictionary processing, among other examples.

File metadata (of inputs 402) is yet another aspect that may be evaluated by an exemplary word order suggestion model 404. File metadata may comprise any attribute data pertaining to a file including naming conventions, file path information, folder associations, associated files, storage locations, tenants and/or owners of file, etc. As shown in process flow 400, input 402 pertaining to file metadata feeds into a weighted model that is used to apply weighting to different attributes of an electronic document. For instance, processing operations may be executed that parse file metadata of an electronic document (e.g. file data/attributes, source code, scripting language). The file metadata may then be evaluated by the word order suggestion model 404. In examples, application of the word order suggestion model 404 may further analyze file metadata associated with an electronic document to determine an ordering of suggestions for a misspelt word. In further examples, word suggestions may also be generated based on analysis of file metadata.

Analysis of file metadata can be useful to identify important content/text that may be of relevance to providing suggestions for a misspelt word. The word order suggestion model 404 may utilize a weighted model to identify importance of words obtained from file metadata for providing suggestions. In one example, words obtained from file metadata may be weighted more heavily as compared to other aspects of evaluation of an electronic document when evaluating content for suggestions and prioritization/ordering of suggestions. However, it is to be understood that weighting applied to different aspects of evaluation of an electronic document including file metadata may vary in accordance with developer specifications.

As an example, an evaluation of file metadata associated with an electronic document may comprise evaluating one or more of: a title of the electronic document and file path information corresponding with the electronic document and/or associated electronic documents. At least one word suggestion and/or a priority for ordering the word suggestion may be determined based on the evaluation of the file metadata associated with an exemplary electronic document.

The word order suggestion model may process the received inputs 402 to generate suggestions for a misspelt word. In one example, the word order suggestion model 404 may evaluate a listing of suggestions provided by the selected language suggestion model. Model processing from evaluation of the other received inputs 402 such as content of the electronic document, formatting of the content and file metadata associated with the electronic document may be used to modify suggestions provided by the selected language suggestion model. In one example, a generated listing of word suggestions, provided by a selected language suggestion model, is re-ordered based on the application of the word suggestion order model. In at least one example, the re-ordering comprises adding at least one new word suggestion based on the application of the word suggestion order model. In some instances, word suggestions may comprise suggestions such as synonyms and/or antonyms identified through information retrieval using platform resources that interface with the word order suggestion model 404.

In generating an exemplary listing of suggestions (or updated listing of suggestions) for a misspelt word, the word order suggestion model 404 may execute one or more policy decisions determining: what word suggestions to include in an exemplary listing and how to order the word suggestions within an exemplary listing. Further policies decisions may be executed including whether to include contextual suggestions/recommendations of content, hyperlinks/links, and UI indications providing rationale for suggestions, among other examples. Execution of a policy decision may comprise aggregating weighting applied by the one or more models to evaluate and order word suggestions. In an example where a histogram model is utilized to evaluate content in an unformatted state, suggestions/recommendations may be generated based on analysis of an exemplary histogram that is created for an electronic document. Processing executed by the word order suggestion model 404 may further apply weighting for suggestions generated from analysis of an exemplary histogram. Processing may be executed to proportionally analyze suggestions (e.g. word suggestions as well as the potential to include other types of suggested/recommended content) for inclusion within an exemplary listing of suggestions.

Policy decision processing may comprise application of a ranker that may assign rankings/scoring to suggestions for determining what suggestions to include and how to order/prioritize suggestions. Policy decision processing may comprise application of statistical analysis modeling potentially including regression analysis for evaluating relationships of content. Consider the "Braille" example provided above. The word order suggestion model 404 may be configured to execute semantic analysis of content of an electronic document. For instance, content of an electronic document can be evaluated by word, sentence, paragraph, entire document, etc. to identify inconsistencies between the misspelt word and other content of the electronic document. As a concrete example, dictionary.com defines "brale" as "a brand of conoidal diamond or diamond-pointed tool, having convexly curved sides meeting at an angle of 120°, used as an indenter in testing the hardness of metals". This is not related to communications for or with the visually impaired. Such analysis is helpful in determining what suggestions to provide as well as how to order example suggestions.

As identified above, exemplary output 406 from processing by the word order suggestion model 404 may comprise a listing of suggestions for a misspelt word. An exemplary listing may comprise word suggestions for a misspelt word as well as other contextual suggestions/recommendations based on analysis executed through application of the word order suggestion model 404. Contextual suggestions/recommendations can be provided to enhance a user experience based on analysis of content of an electronic document. As an example, an exemplary listing may comprise links to related content that a user can access for additional information. As an illustrative example, see user interface view 430 (FIG. 4C) that highlighting the inclusion of contextual links that may be of interest to a user. It is to be understood that other content including media content, audio files, text, rich media, etc. may also be included within an exemplary listing of suggestions for a misspelt word. In other examples, associated files (stored either locally or on a distributed network) for a user may be identified within an exemplary listing of suggestions. In some examples, associated files may be shared among a plurality of users.

In an alternative example, an exemplary output 406 may comprise a UI indication for a potential misspelling of a word. As described, an exemplary word order suggestion model 404 is configured to identify and flag potentially misspelt words based on a context of an electronic document. Word suggestions identifying a potentially unintended/misspelt word as well as rationale for why a word may be unintended/misspelt may be provided for a user, for example. For instance, a user may not have noticed that a wrong word or unintended word was entered. As an example, application of an exemplary word order suggestion model may flag a potentially unintended word and provide a UI feature (e.g. bubble, call-out, etc.) provided a reason why a word suggestion is being provided. In the "Braille" example provided above, a UI feature may indicate that a word suggestion of "Braille" was provided as a potential replacement for "brale" because the context of the electronic document is describing written language for the visually-impaired. In some instances, an exemplary UI indication may be separate from an exemplary listing of suggestions for a misspelt word. For example, an indication that an individual word is potentially misspelt may be automatically highlighted within an electronic document. A user may execute an action with respect to the indication, where a UI indication is provided explanation/rationale as to why an exemplary word order suggestion model 404 believes the word is misspelt/unintended. In some examples, an exemplary output 406 may comprise a single word suggestion for a potentially misspelt/unintended word. In the case where an indication is provided for a word that is potentially misspelt/unintended, an exemplary word order suggestion model 404 may output a highest ranked/prioritized word suggestion for the word. It is to be understood that output 406 presentation of any word suggestion, contextual suggestions and/or UI indications may vary and are not limited to a complete listing of all types of suggestions for a misspelt word.

Figure 4B:
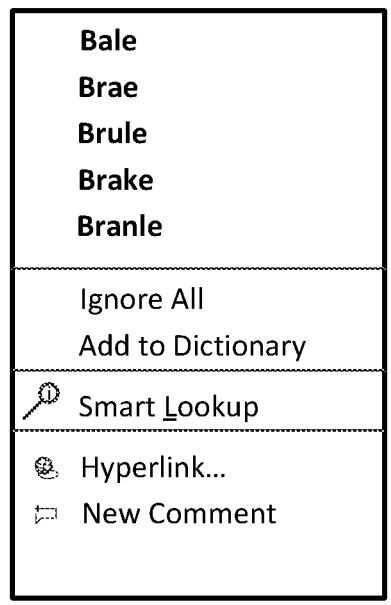
FIGS. 4B and 4C provide user interface views providing a before and after illustration of an exemplary listing of suggestions for a misspelt word with which aspects of the present disclosure may be practiced.
Figure 4C:
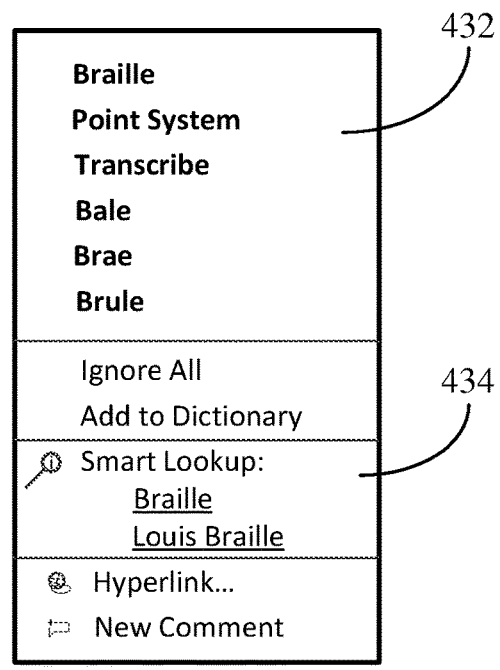

Processing by the word order suggestion model 404 may add (and prioritize) a word suggestion of "Braille" to an exemplary listing for a potentially misspelt word "brale". In determining that "Braille" is a priority word suggestion other FIGS. 4B and 4C provide user interface views (420 and 430 respectively) providing a before and after illustration of an exemplary listing of suggestions for a misspelt word with which aspects of the present disclosure may be practiced. User interface view 420 (FIG. 4B) provides an example of a listing of word suggestions provided by a standard language model. Returning to the "Braille" example, a user may have entered a word "brale" that is identified as a potentially misspelt word. As can be seen in user interface view 420, the suggestions (bale, braw, brule, brake, branle) provided by a standard language model are dictionary-based and not relevant to an electronic document that relates to a written language for the visually-impaired. User interface view 430 (FIG. 4C) illustrates an exemplary listing of suggestions based on processing by a word order model 404 as described above. As can be seen in user interface view 430, may add (and prioritize) word suggestions 432 such as "Braille" to an exemplary listing for a potentially misspelt word "brale". Other related words (e.g. synonyms, descriptors, phrasing suggestions) may also be recommended in the listing of word suggestions 432, for example, based on analysis of the different aspects of the electronic document (in combination with information retrieval that utilizes exemplary platform resources). Moreover, an exemplary listing of suggestions displayed in user interface view 430 may comprise additional contextual suggestions/recommendations 434 for a user. As can be seen in user interface view 430, additional contextual suggestions/recommendations 434 comprise hyperlinks for "Braille" and "Louis Braille" providing a user with easy access to additional content if desired. User interface view 430 provides just one example of additional contextual suggestions/recommendations 434. As described above other types of content and/or associations may be provided for a user including but not limited to: rich interactive objects, media objects, and associations to files and/or users, among other examples.

Figure 5:
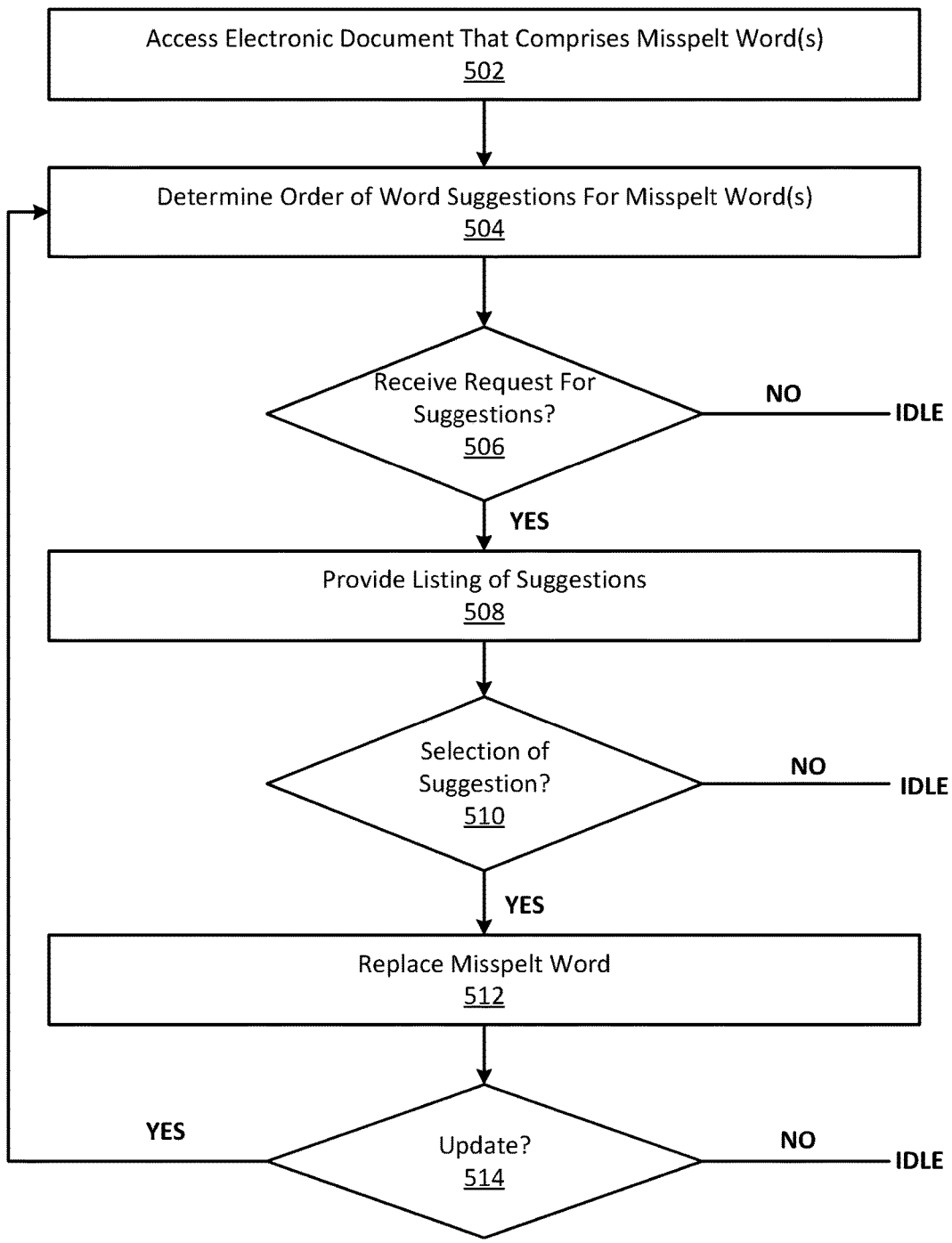
FIG. 5 is an exemplary method related to management of an exemplary listing of suggestions for a misspelt word with which aspects of the present disclosure may be practiced.

FIG. 5 is an exemplary method 500 related to management of an exemplary listing of suggestions for a misspelt word with which aspects of the present disclosure may be practiced. As an example, method 500 may be executed by an exemplary processing device and/or system such as those shown in FIGS. 1-3. In examples, method 500 may execute on a device comprising at least one processor configured to store and execute operations, programs or instructions. Operations performed in method 500 may correspond to operations executed by a system and/or service that execute computer programs, application programming interfaces (APIs), neural networks or machine-learning processing, among other examples. As an example, processing operations executed in method 500 may be performed by one or more hardware components. In another example, processing operations executed in method 500 may be performed by one or more software components. In some examples, processing operations described in method 500 may be executed by one or more applications/services associated with a web service that has access to a plurality of application/services, devices, knowledge resources, etc. Processing operations described in method 500 may be implemented by one or more components connected over a distributed network, for example, as described in system 600 (of FIG. 6).

Method 500 begins at processing operation 502, where an exemplary electronic document is accessed. Examples of electronic documents have been provided in the foregoing description including the description of process flow 400 (FIG. 4A). As an example, the electronic document may comprise one or more misspelt words. In some examples, a potentially misspelt/unintended word may be added to an electronic document in real-time. In examples, an exemplary electronic document may be accessed through a client computing device where the electronic document is either stored locally on the client computing device or accessed through an application/service via a distributed network connection.

Flow may proceed to processing operation 504, where word suggestions and/or an order of the word suggestions is determined. Word suggestions and an order/priority for word suggestions for the misspelt word may be determined based on an application of an exemplary word order suggestion model that analyzes the misspelt word. An exemplary word order suggestion model is described in the description of process flow 400 (word order suggestion model 404). In examples, processing operation 504 may comprise applying an exemplary word order suggestion model that may be configured to provide: an analysis of an unformatted state of content within the electronic document and an analysis of formatting associated with content of the electronic document. Further aspects of an electronic document including file metadata may be analyzed by the word order suggestion model. Moreover, processing operation 504 may comprise retrieving additional information for content, where an exemplary word order suggestion model may interface with platform resources to obtain contextual information, suggestions, etc. for misspelt words.

In evaluating an unformatted state of content of the electronic document, the one or more models may be configured to evaluate a similarity between the misspelt word and other words of the electronic document. For instance, frequency of words used in the electronic document may be evaluated. At least one word suggestion and/or a priority for ordering the word suggestion may be determined based on the evaluation of the frequency of words in the electronic document. With respect to analysis of the formatting of content of the electronic document, the word order suggestion model may be configured to evaluate an importance of specific words of the electronic document based on formatting associated with the specific words. Word suggestions and/or a priority for ordering word suggestions may be determined based on the analysis of the formatting associated with words of the electronic document.

In further examples, application of the word order suggestion model may further analyze file metadata associated with an electronic document to determine an ordering of suggestions for a misspelt word. An evaluation of file metadata associated with an electronic document may comprise evaluating one or more of: a title of the electronic document and file path information corresponding with the electronic document and/or associated electronic documents. At least one word suggestion (and/or a priority for ordering the word suggestion) may be determined based on the evaluation of the file metadata associated with an exemplary electronic document. In some instances, processing operation 504 may comprise re-ordering a generated listing of word suggestions (i.e. of a standard language model) based on the application of the word suggestion order model. The re-ordering may comprise adding at least one new word suggestion based on the application of the word suggestion order model.

Flow may proceed to decision operation 506, where it is determined whether a request is received for suggestions for a misspelt word. As identified in the foregoing examples, application of an exemplary word order suggestion model may detect potentially misspelt/unintended words. In some examples, a misspelt word may be automatically identified for a user during viewing of an electronic document. Decision operation 506 may detect whether input is received requesting an application/service to provide suggestions for a misspelt word. Receipt of input may be in any form and is known to one skilled in the field of art. If no input is received, flow branches NO and processing remains idle until a request for a misspelt word is received. In some cases, an exemplary UI indication or notification may be provided through an application/service indicating that suggestions are available for a potentially misspelt/unintended word.

In examples where input is received requesting that suggestions be provided for a misspelt word, flow branches YES and proceeds to processing operation 508. At processing operation 508, an exemplary listing of suggestions is provided, for example, based on a received request for suggestions. Examples of an exemplary listing of suggestions has been described in the foregoing description including the description of process flow 400 (word order suggestion model 404). In examples, an order of word suggestions included in an exemplary listing of suggestions is determined based on the application of the word order suggestion model.

Flow of method 500 may proceed to decision operation 510, where it is determined whether a selection of a suggestions is made. If not, flow branches NO and processing remains idle. A selection of a suggestion may comprise receiving input selecting a word suggestion (or contextual suggestion) from an exemplary listing of suggestions. In examples where a selection of a word suggestion is made, flow branches YES and proceeds to processing operation 512, where a misspelt word may be replaced. In examples where a selection pertains to a contextual suggestion, processing operation 512 may guide a computing device to access content associated with a contextual suggestion/recommendation.

At decision operation 514, it is determined whether there is an update to an electronic document. An update to an electronic document may comprise addition of content including one or more additional misspelt/unintended words. In examples where no update occurs to the electronic document, flow branches NO and processing remains idle. In examples where an update occurs to an electronic document, flow branches YES and processing returns to processing operation 504.

FIG. 6 illustrates an exemplary system 600 implementable on one or more computing devices on which aspects of the present disclosure may be practiced. System 600 may be an exemplary system for log data evaluation and subsequent processing based on results of the log data evaluation. Components of system 600 may be hardware components or software implemented on and/or executed by hardware components. In examples, system 600 may include any of hardware components (e.g., ASIC, other devices used to execute/run an OS, and software components (e.g., applications, application programming interfaces, modules, virtual machines, runtime libraries) running on hardware. In one example, an exemplary system 600 may provide an environment for software components to run, obey constraints set for operating, and makes use of resources or facilities of the systems/processing devices, where components may be software (e.g., application, program, module) running on one or more processing devices. For instance, software (e.g., applications, operational instructions, modules) may be executed on a processing device such as a computer, mobile device (e.g., smartphone/phone, tablet) and/or any other type of electronic devices. As an example of a processing device operating environment, refer to operating environments of FIGS. 1-3. One or more components of system 600 may be configured to execute any of the processing operations described in at least method 400 described in the description of FIG. 4 and method 500 described in the description of FIG. 5. In other examples, the components of systems disclosed herein may be spread across multiple devices. Exemplary system 600 comprises application components 606 that further comprise: a content suggestion component 608 and a platform resource component 610.

One or more data stores/storages or other memory may be associated with system 600. For example, a component of system 600 may have one or more data storage(s) 612 (described below) associated therewith. Data associated with a component of system 600 may be stored thereon as well as processing operations/instructions executed by a component of system 600. Furthermore, it is presented that application components of system 600 may interface with other application services. Application services may be provided as platform resources referenced in the foregoing. Application services may be any resource that may extend functionality of one or more components of system 600. Application services may include but are not limited to: personal intelligent assistant services, productivity applications, web search services, e-mail applications, calendars, device management services, address book services, informational services, line-of-business (LOB) management services, customer relationship management (CRM) services, debugging services, accounting services, payroll services and services and/or websites that are hosted or controlled by third parties, among other examples. Application services may further include other websites and/or applications hosted by third parties such as social media websites; photo sharing websites; video and music streaming websites; search engine websites; sports, news or entertainment websites, and the like. Application services may further provide analytics, data compilation and/or storage service, etc., in association with components of system 600.

System 600 may comprise one or more storage(s) 612 that may store data associated with operation of one or more components of system 600. In examples, storage(s) 612 may interface with other components of system 600. Data associated with any component of system 600 may be stored in storage(s) 612, where components may be connected to storage(s) 612 over a distributed network including cloud computing platforms and infrastructure services. Exemplary storage(s) 612 may be any of a first-party source, a second-party source, and a third-party source. Storage(s) 612 are any physical or virtual memory space. Storage(s) 612 may store any data for processing operations performed by components of system 600, retained data from processing operations, stored programs, code or application programming interfaces (APIs), training data, links to resources internal and external to system 600 and knowledge data among other examples. Furthermore, in examples, components of system 600 may utilize knowledge data in processing by components of system 600. Knowledge may be used by one or more components of system 600 to improve processing of any of the application components 606 where knowledge data can be obtained from resources internal or external to system 600. In examples, knowledge data may be maintained in storage(s) 612 or retrieved from one or more resources external to system 600 by knowledge fetch operation.

In FIG. 6, processing device 602 may be any device comprising at least one processor and at least one memory/storage. Examples of processing device 602 may include but are not limited to: processing devices such as desktop computers, servers, phones, tablets, phablets, slates, laptops, watches, and any other collection of electrical components such as devices having one or more processors or circuits. In one example processing device 602 may be a device of a user that is executing applications/services. In examples, processing device 602 may communicate with the application components 606 via a network 604. In one aspect, network 404 is a distributed computing network, such as the Internet. Application services may communicate with application components 606 via the network 604. Processing device 602 may be a device as described in the description of FIGS. 1-3. In some examples, processing device 602 may comprise multiple connected devices. Processing device 602 is an example of a user computing device.

The processing device 602 may execute processing operations that include an ability to access an application/service through a user account. In one example, processing device 602 may connect an authenticated user to an exemplary application/service that stores user data for one or more users of the application/service. An exemplary storage application/service may provide a user of processing device 602 with access to data stored in an exemplary data center. In one example, processing device 602 may be connected with storage(s) 612 via a distributed network, which may provide users with access to user data. One or more tenant resources (e.g. Tenant Resource A, Tenant Resource B, Tenant Resource C, etc.) may be associated with processing device 602. A tenant resource may be a user account associated with a processing device and/or distributed network service. Data associated with a tenant resource may be stored on storage(s) 612, where a tenant account can be utilized to access stored data by processing device 602 and/or other processing devices.

The application components 606 are a collection of components that interface to enable an exemplary word order suggestion model to be applied and provide suggestions for content of an electronic document based on application of the word order suggestion model. Examples of a word order suggestion model have been described in the foregoing description of FIGS. 4A-5. As identified above, application components 606 may comprise: a content suggestion component 608 and a platform resource component 610. Processing associated with any of the application components may be provided as a service, for example, over a distributed network.

The content suggestion component 608 may be configured to provide an exemplary word order suggestion model as described in the foregoing. An exemplary word order suggestion model such as word order suggestion model 404 (FIG. 4A) may be provided within an exemplary productivity application or may be provided as a service that provides exemplary suggestions to a productivity application, operating system (OS) of a computing device, etc. A productivity application is any application that is utilized to provide an exemplary electronic document. Examples of productivity applications include but are not limited to: web browser applications, word processing applications, spreadsheet applications, presentation applications, note applications, etc. In alternative examples, a listing of suggestions for the misspelt word may be generated by one or more devices of a distributed network. In examples where an exemplary listing is generated by a distributed service, the listing may be transmitted to a client computing device, for example, for display with an executing productivity application.

The platform resource component 610 is a component configured to interface with the content suggestion component 608 to extend functionality that is accessible by the content suggestion component 608. When an exemplary word order suggestion model is being executed, the platform resource component 610 may be utilized to provide additional functionality for information retrieval, access to platform resources (e.g. application services described in the foregoing). In examples where a word order suggestion model is provided as a service, an exemplary platform resource component 610 may interface with the content suggestion component 608 to enable communication with applications/services such as productivity applications.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
    accessing an electronic document that comprises a misspelt word;
    determining an order of word suggestions for the misspelt word based on an application of a word order suggestion model that analyzes the misspelt word based on:
        an analysis of an unformatted state of content within the electronic document, and
        an analysis evaluating types of formatting associated with the content of the electronic document; and
    providing a listing of suggestions for the misspelt word, wherein an order of word suggestions included in the listing is determined based on the application of the word order suggestion model.

2. The method of claim 1, wherein the application of the word order suggestion model further analyzes the misspelt word based on an analysis of file metadata associated with the electronic document.

3. The method of claim 2, wherein in analyzing the file metadata, the application of the word order suggestion model evaluates a title of the electronic document and file path information corresponding with the electronic document.

4. The method of claim 2, wherein the application of the word order suggestion model comprises assigns weighting to each of the analysis of the content of the electronic document, the analysis of the formatting of the content of the electronic document and the analysis of the file metadata associated with the electronic document.

5. The method of claim 1, wherein the analysis of an unformatted state of content within the electronic document comprises: evaluating a frequency of words used in the electronic document and determining a priority for ordering word suggestions of the listing based on an evaluation of the frequency of words, and wherein the analysis of the formatting associated with the content of the electronic document comprises: evaluating an importance of particular words of the electronic document based on formatting associated with the particular words and determining a priority for ordering word suggestions of the listing based on an evaluation of the formatting.

6. The method of claim 1, further comprising receiving input selecting a word suggestion from the listing and replacing the misspelt word with a selected word suggestion.

7. The method of claim 1, further comprising receiving a request to provide suggestions for the misspelt word and wherein the listing is provided based on the received request.

8. The method of claim 1, wherein the determining further comprises re-ordering a generated listing of suggestions based on the application of the word order suggestion model, and wherein the re-ordering comprises adding at least one new word suggestion based on the application of the word order suggestion model.

9. A system comprising:
    at least one processor; and
    a memory operatively connected with the at least one processor storing computer-executable instructions that, when executed by the at least one processor, causes the at least one processor to execute a method that comprises:
        accessing an electronic document that comprises a misspelt word,
        determining an order of word suggestions for the misspelt word based on a word order suggestion model that analyzes the misspelt word based on:
            an analysis of an unformatted state of content within the electronic document, and
            an analysis evaluating types of formatting associated with the content of the electronic document, and
        providing a listing of word suggestions for the misspelt word, wherein an order of word suggestions included in the listing is determined based on the application of the word order suggestion model.

10. The system of claim 9, wherein the application of the word order suggestion model further analyzes the misspelt word based on an analysis of file metadata associated with the electronic document.

11. The system of claim 10, wherein in analyzing the file metadata, the application of the word order suggestion model evaluates a title of the electronic document and file path information corresponding with the electronic document.

12. The system of claim 10, wherein the application of the word order suggestion model comprises assigns weighting to each of the analysis of an unformatted state of content within the electronic document, the analysis of the formatting of the content of the electronic document and the analysis of the file metadata associated with the electronic document.

13. The system of claim 9, wherein the analysis of an unformatted state of content within the electronic document comprises: evaluating a frequency of words used in the electronic document and determining a priority for ordering word suggestions of the listing based on an evaluation of the frequency of words, and wherein the analysis of the formatting associated with the content of the electronic document comprises: evaluating an importance of particular words of the electronic document based on formatting associated with the particular words and determining a priority for ordering word suggestions of the listing based on an evaluation of the formatting.

14. The system of claim 9, wherein the method, executed by the at least one processor, further comprises: receiving input selecting a word suggestion from the listing and replacing the misspelt word with a selected word suggestion.

15. The system of claim 9, wherein the method, executed by the at least one processor, further comprises: receiving a request to provide suggestions for the misspelt word and wherein the listing is provided based on the received request.

16. The system of claim 9, wherein the determining further comprises re-ordering a generated listing of suggestions based on the application of the word order suggestion model, and wherein the re-ordering comprises adding at least one new word suggestion based on the application of the word order suggestion model.

17. A computer-readable medium storing computer-executable instructions that, when executed by at least one processor, causes the at least one processor to execute a method comprising:
   accessing an electronic document that comprises a misspelt word;
   determining an order of word suggestions for the misspelt word based on an application of a word order suggestion model that analyzes the misspelt word based on:
      an analysis of an unformatted state of content within the electronic document, and
      an analysis evaluating types of formatting associated with the content of the electronic document; and
   providing a listing of word suggestions for the misspelt word, wherein an order of word suggestions included in the listing is determined based on the application of word order suggestion model.

18. The computer-readable medium of claim 17, wherein the application of the word order suggestion model further analyzes the misspelt word based on an analysis of file metadata associated with the electronic document, and wherein in analyzing the file metadata, the application of the word order suggestion model evaluates a title of the electronic document and file path information corresponding with the electronic document.

19. The computer-readable medium of claim 17, wherein the analysis of an unformatted state of content within the electronic document comprises: evaluating a frequency of words used in the electronic document and determining a priority for ordering word suggestions of the listing based on an evaluation of the frequency of words, and wherein the analysis of the formatting associated with the content of the electronic document comprises: evaluating an importance of particular words of the electronic document based on formatting associated with the particular words and determining a priority for ordering word suggestions of the listing based on an evaluation of the formatting.

20. The computer-readable medium of claim 17, wherein the determining further comprises re-ordering a generated listing of suggestions based on the application of the word order suggestion model and wherein the re-ordering comprises adding at least one new word suggestion based on the application of the word order suggestion model.

* * * * *